(12) United States Patent
Zheng (10) Patent No.: US 11,186,075 B2
(45) Date of Patent: Nov. 30, 2021

(54) FINGERPRINT MODULE ATTACHING METHOD AND DEVICE

(71) Applicants: CHENGDU OPTOELECTRONICS TECHNOLOGY CO., LTD., Sichuan (CN); BOE TECHNOLOGY GROUP CO., LTD., Beijing (CN)

(72) Inventor: Kunlong Zheng, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 109 days.

(21) Appl. No.: 16/420,218

(22) Filed: May 23, 2019

(65) Prior Publication Data

US 2020/0101709 A1    Apr. 2, 2020

(30) Foreign Application Priority Data

Sep. 28, 2018 (CN) .......................... 201811142175.0

(51) Int. Cl.
*B32B 37/00* (2006.01)
*B32B 38/00* (2006.01)
(Continued)

(52) U.S. Cl.
CPC ............ *B32B 37/025* (2013.01); *B32B 27/06* (2013.01); *B32B 27/36* (2013.01); *B32B 38/10* (2013.01);
(Continued)

(58) Field of Classification Search
CPC ... B32B 37/205; B32B 38/10; B32B 2405/00; B32B 27/36; B32B 27/06;
(Continued)

(56) References Cited

U.S. PATENT DOCUMENTS 4,282,056 A * 8/1981 Okui .................... B26D 7/1827
118/37
9,011,624 B2 * 4/2015 Furutani .................... C09J 7/30
156/247

(Continued)

FOREIGN PATENT DOCUMENTS

CN    103723324 A    4/2014
CN    104156105 A    11/2014
(Continued)

OTHER PUBLICATIONS

First Office Action for Chinese Patent Application No. 201811142175.0 dated Mar. 13, 2020.

*Primary Examiner* — Linda L Gray
(74) *Attorney, Agent, or Firm* — Calfee, Halter & Griswold LLP (57) ABSTRACT

A method for attaching a fingerprint module which includes providing an adhesive tape which includes a base film, a protective film which is oppositely arranged to the base film, and a number of adhesive layers positioned between the base film and the protective film and are arranged at intervals, and each of the base film and the protective film is an integral piece of film which is continuous in an entire layer. The method further includes partially peeling off the protective film to expose a first adhesive surface of one of the plurality of adhesive layers; attaching the fingerprint module to the exposed first adhesive surface of the adhesive layer; and peeling off the attached fingerprint module and adhesive layer together from the base film to expose a second adhesive surface of the adhesive layer.

17 Claims, 3 Drawing Sheets

(51) Int. Cl.
*B32B 27/00* (2006.01)
*B32B 27/06* (2006.01)
*B32B 27/36* (2006.01)
*B32B 38/10* (2006.01)

(52) U.S. Cl.
CPC ..... *B32B 2457/206* (2013.01); *Y10T 156/171* (2015.01); *Y10T 156/1705* (2015.01); *Y10T 156/1744* (2015.01); *Y10T 156/1751* (2015.01); *Y10T 156/1768* (2015.01)

(58) Field of Classification Search
CPC ......... B32B 2457/206; Y10T 156/1707; Y10T 156/1705; Y10T 156/171; Y10T 156/1744; Y10T 156/1751; Y10T 156/1768; B29C 65/7858; B44C 3/02
See application file for complete search history.

(56) References Cited

U.S. PATENT DOCUMENTS

| | | | |
|---|---|---|---|
| 10,016,970 | B1 | 7/2018 | Eigenfeld et al. |
| 2004/0101673 | A1 | 5/2004 | Schoppman |
| 2007/0137773 | A1* | 6/2007 | Chen ................ H01L 24/29 |
| | | | 156/235 |
| 2018/0053037 | A1 | 2/2018 | Zhang |
| 2018/0322323 | A1* | 11/2018 | Ran ................ H04M 1/026 |

FOREIGN PATENT DOCUMENTS

| | | |
|---|---|---|
| CN | 106203402 A | 12/2016 |
| CN | 206515570 U | 9/2017 |
| CN | 107248551 A | 10/2017 |
| CN | 108090480 A | 5/2018 |
| JP | 2007296606 A | 11/2007 |

* cited by examiner

FINGERPRINT MODULE ATTACHING METHOD AND DEVICE

CROSS REFERENCE TO RELATED APPLICATIONS

This application claims priority to Chinese patent application No. 201811142175.0, filed on Sep. 28, 2018, the entire contents of which are hereby incorporated by reference.

TECHNICAL FIELD

The disclosure relates to the technical field of displays, in particular to a method and device for attaching a fingerprint module.

BACKGROUND

With the rapid development of display technology, self-luminous displays have been widely used. Self-luminous displays include Organic Light-Emitting Diode (OLED) displays and quantum dot light-emitting diodes (QLED) displays. Since the self-luminous display screen has self-luminous characteristics, there is no need to provide a backlight source, therefore the fingerprint module can be provided on the back side of the self-luminous display screen to realize the function of in-display fingerprint identification. At present, the fingerprint module is usually fixed on the side (i.e. back side) where the non-display surface of the display panel is located by means of double-sided adhesive tape or an adhesive layer. The current commercially available double-sided adhesive tape usually includes an adhesive layer and two non-adhesive protective films for protecting the adhesive layer. In the attaching operation using such double-sided adhesive tape, it is usually necessary to remove a layer of protective film to expose an adhesive surface of the double-sided adhesive tape and attach the adhesive surface to the fingerprint module.

Then the other protective film of the double-sided adhesive tape is removed to expose the other adhesive surface of the double-sided adhesive tape. The other adhesive surface is attached to the back surface of the display panel, thereby completing the attaching of the fingerprint module and the display panel.

However, because the adhesive layer of the double-sided adhesive tape is very thin, when the protective film is removed from the adhesive layer, the adhesive layer is prone to winkle and bend, resulting in a low attachment yield of the fingerprint module and the display panel.

SUMMARY

According to an exemplary embodiment, there is provided a method for attaching a fingerprint module, the method comprising the following steps:
providing an adhesive tape, wherein the adhesive tape comprises a base film, a protective film which is oppositely arranged to the base film, and a plurality of adhesive layers which are positioned between the base film and the protective film and are arranged at intervals, and each of the base film and the protective film is an integral piece of film which is continuous in an entire layer;
partially peeling off the protective film to expose a first adhesive surface of one of the plurality of adhesive layers;
attaching the fingerprint module to the exposed first adhesive surface of the adhesive layer; and
peeling off the attached fingerprint module and adhesive layer together from the base film to expose a second adhesive surface of the adhesive layer.

According to an exemplary embodiment, before providing the adhesive tape, the method further comprises:
providing a roll of adhesive tape; and planarizing the roll of adhesive tape to form the adhesive tape.

According to an exemplary embodiment, partially peeling off the protective film to expose a first adhesive surface of one of the plurality of adhesive layers comprises:
during conveying the adhesive tape toward the fingerprint module, partially peeling off the protective film to expose the first adhesive surface of one of the plurality of adhesive layers.

According to an exemplary embodiment, attaching the fingerprint module to the exposed first adhesive surface of the adhesive layer comprises:
conveying the adhesive tape towards the fingerprint module to align the exposed first adhesive surface of the adhesive layer with the fingerprint module; and
pressing down the fingerprint module to attach to the exposed first adhesive surface of the adhesive layer.

According to an exemplary embodiment, peeling off the attached fingerprint module and adhesive layer together from the base film to expose the second adhesive surface of the adhesive layer comprises:
lifting the attached fingerprint module and adhesive layer together to peel off from the base film so as to expose the second adhesive surface of the adhesive layer.

According to an exemplary embodiment, after peeling off the attached fingerprint module and adhesive layer together from the base film, the method further comprises:
moving the attached fingerprint module and adhesive layer together to a position aligned with a display panel;
attaching the fingerprint module to a non-display surface of the display panel through the exposed second adhesive surface of the adhesive layer.

According to an exemplary embodiment, peeling off the protective film is achieved by winding the protective film onto a rotatable shaft and then rotating the shaft.

According to an exemplary embodiment, after peeling off the attached fingerprint module and adhesive layer together from the base film, the method further comprises the step of winding up and collecting the peeled base film.

According to an exemplary embodiment, the thickness of the adhesive layer ranges from 1 to 200 microns.

According to an exemplary embodiment, the base film and the protective film are both made of polyethylene terephthalate polymer.

According to an exemplary embodiment, the release force of the base film is greater than that of the protective film.

According to another exemplary embodiment, there is provided an attaching device for a fingerprint module, comprising: an adhesive tape feeding assembly, a protective film peeling assembly, a peeling platform and an attaching press head;
wherein the adhesive tape feeding assembly is configured to supply an adhesive tape, and the adhesive tape comprises a base film, a protective film which is oppositely arranged to the base film, and a plurality of adhesive layers which are positioned between the base film and the protective film and are arranged at intervals, wherein each of the base film and the protective film is an integral piece of film which is continuous in an entire layer;
wherein the protective film peeling assembly is configured to peel off the protective film to expose a first adhesive surface of one of the plurality of adhesive layers;

wherein the peeling platform is configured to support the adhesive tape when peeling off the protective film and after peeling off the protective film, the adhesive layer is positioned on one side of the base film which is facing away from the peeling platform; and wherein the attaching press head is configured to support a fingerprint module and can press down the fingerprint module to attach to the exposed first adhesive surface of the adhesive layer and can peel off the attached fingerprint module and adhesive layer together from the base film to expose a second adhesive surface of the adhesive layer.

According to an exemplary embodiment, the protective film peeling assembly comprises a rotatable shaft. Peeling off the protective film is realized by winding the protective film onto the shaft and then rotating the shaft.

According to an exemplary embodiment, the adhesive tape feeding assembly comprises an adhesive tape roll supplying assembly and an adhesive tape roll planarizing assembly, wherein the adhesive tape roll supplying assembly is configured to supply an adhesive tape roll and the adhesive tape roll planarizing assembly is configured to planarize the adhesive tape roll to form the adhesive tape.

According to an exemplary embodiment, the attaching device further comprises: a receiving assembly for collecting the base film.

According to an exemplary embodiment, the attaching device further comprises: a display panel supporting platform for supporting a display panel, a display surface of the display panel facing the supporting surface of the display panel supporting platform. The attaching press head is further configured to attach the fingerprint module to a non-display surface of the display panel through a second adhesive surface of the adhesive layer, and the non-display surface is arranged opposite to the display surface.

According to an exemplary embodiment, the attaching device further comprises a base on which the adhesive tape feeding assembly, the protective film peeling assembly, the peeling platform and the attaching press head are assembled.

DETAILED DESCRIPTION

In order to make the objects, technical solutions and advantages of the present disclosure clearer, exemplary embodiments will be described in further detail below with reference to the accompanying drawings.

Some exemplary embodiment provide a method and device for attaching a fingerprint module, which can solve the problem of low effective attaching yield of the fingerprint module and a display panel in the prior art.

Figure 1:
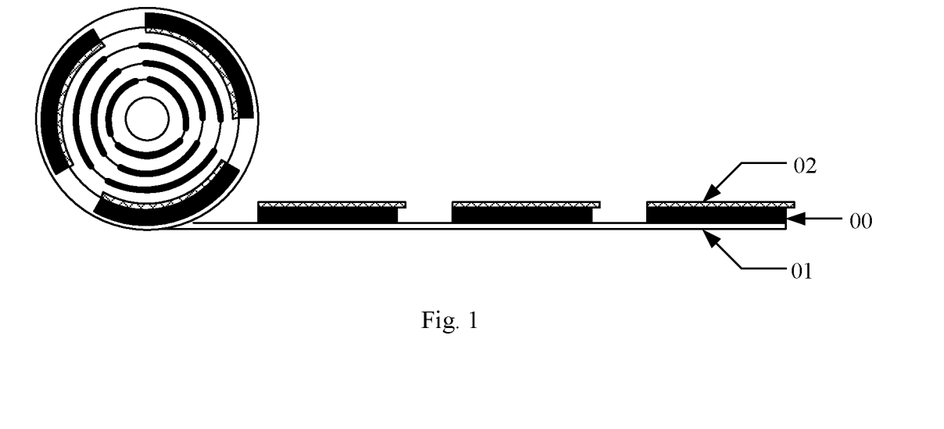
FIG. 1 is a schematic structural view of an adhesive tape provided by an exemplary embodiment.

FIG. 1 is a schematic structural view of an adhesive tape provided by some embodiments of the present disclosure. As shown in FIG. 1, the adhesive tape is first provided in a form of a roll, i.e., a roll of adhesive tape. Providing the adhesive tape in the form of roll facilitates automatic attaching of the fingerprint module and the display panel by an attaching machine. Each layer of the unwound adhesive tape roll comprises a protective film 02, an adhesive layer 00 and a base film 01 which are sequentially stacked, wherein the base film 01 extends continuously without interruption, and the adhesive layer 00 and the corresponding protective film 02 are discretely arranged on the base film 01. A first side of the adhesives layer 00 is attached to the base film 01, and a second side of it is attached to the discrete protective film 02. The first side and the second side are two opposite surfaces. The base film may be a heavy film and the protective film may be a light film.

The process of automatically attaching a fingerprint module to a display panel by the attaching machine comprises the following steps: arranging the fingerprint module on an attaching platform; tearing the base film 01 away from the adhesive layer 00 to expose a first side of the adhesive layer 00, and attaching the first side of the adhesive layer 00 to the fingerprint module through an attaching press head; turning the attaching platform 180 degrees and peeling off the protective film on the adhesive layer 00 to expose a second side of the adhesive layer 00; attaching the second side of the adhesive layer 00 to a non-display surface of a display panel through an attaching platform to complete the attaching of the fingerprint module to the display panel.

Although this attaching process is improved compared with the prior art, since the protective film 02 has a discrete shape, the processing cost of the adhesive tape itself is high and the protective film 02 is not easy remove from the adhesive tape, resulting in high attaching cost of the fingerprint module to the display panel.

Figure 2:
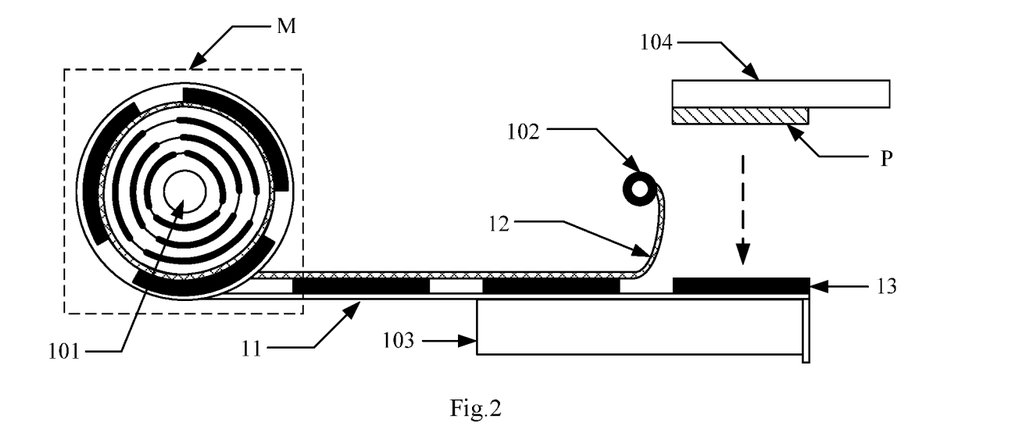
FIG. 2 is a schematic structural view of an attaching device for a fingerprint module according an exemplary embodiment.

To this end, the inventors of the present application have made further improvements. FIG. 2 is a schematic structural view of an attaching device for a fingerprint module provided by an exemplary embodiment. As shown in FIG. 2, the attaching device includes an adhesive tape feeding assembly 101, a protective film peeling assembly 102, a peeling platform 103, and an attaching press head 104.

The adhesive tape feeding assembly 101 is used to feed the adhesive tape M.

Referring to FIG. 2, layers of the unwound adhesive tape M includes a base film 11, a protective film 12, and a plurality of adhesive layers 13 positioned between the base film 11 and the protective film 12 and arranged at intervals. Each of the base film 11 and the protective film 12 is an integral piece of film which is continuous in an entire layer. The base film may be a heavy film and the protective film may be a light film.

It should be noted that in the adhesive tape M provided in the exemplary embodiment of FIG. 2, each of the base film 11 and the protective film 12 is a structure with an integral layer, i.e., each of the base film 11 and the protective film 12 is an integral piece of film which is continuous in an entire layer. Compared with the adhesive tape with the discrete protective films 02 in FIG. 1, the die cutting cost of the protective film can be effectively reduced. Moreover, in the adhesive tape provided in FIG. 2, since the base film 11 is a heavy film, the adhesive force between the base film 11 and the adhesive layer 13 is much larger than that between the protective film 12 and the adhesive layer 13. Therefore, when the protective film 12 is peeled off, the adhesive layer 13 is not easy to detach and wrinkle, thus further improving the production yield and reducing the production cost.

The protective film peeling assembly 102 is used to peel off the protective film 12 to expose a first adhesive surface of the adhesive layer 13 (i.e., an upper surface of the adhesive layer 13 in FIG. 2).

The peeling platform 103 is used to support the adhesive tape when peeling off the protective film 12 and after peeling off the protective film 12, and the adhesive layer 13 is located at the side of the base film 11 facing away from the peeling platform 103.

The attaching press head 104 is configured to carry the fingerprint module P and can attach the carried fingerprint module P to the exposed first adhesive surface of the adhesive layer on the base film 11, and peel off the attached fingerprint module P and adhesive layer together from the base film 11, for example, by means of a removal mechanism (such as a scraper or the like) for the base film 11 or directly peel the attached fingerprint module P and adhesive layer together from the base film 11 without the aid of the base film removal mechanism.

In some exemplary embodiments, the release force of the base film 11 is greater than that of the protective film 12. The thickness of the adhesive layer 13 ranges from 1 to 200 microns, and the base film 11 and the protective film 12 are both made from polyethylene terephthalate (PET) polymers.

It should be noted that since the release force of the base film 11 is greater than the release force of the protective film 12, when peeling off the protective film 12, it can be ensured that the adhesive layer 13 adheres to the base film instead of peeling off together with the protective film 12.

After peeling off the protective film 12, the exposed adhesive layer 13 on the base film 11 can be kept planar. The fingerprint module P is attached to the exposed first adhesive surface of the adhesive layer 13 on the base film 11 by an attaching press head 104. At this time, since the first adhesive surface of the adhesive layer 13 and the fingerprint module P are firmly attached, the attached fingerprint module P and the adhesive layer 13 can be peeled off from the base film 11 together without causing the adhesive layer 13 to wrinkle or bend. In this way, on the one hand, the cost increase caused by the damage of the adhesive layer 13 is reduced, and the attaching yield of the fingerprint module P and the display panel can be ensured; on the other hand, after the fingerprint module P is attached to the adhesive layer 13, the peeling of the second adhesive surface of the adhesive layer 13 (i.e., the lower surface in FIG. 2) from the base film 11 can be completed directly by lifting the attaching press head 104 without turning the attaching platform 180 degrees, thus saving the turning time and ensuring the attaching efficiency of the fingerprint module P.

Figure 3:
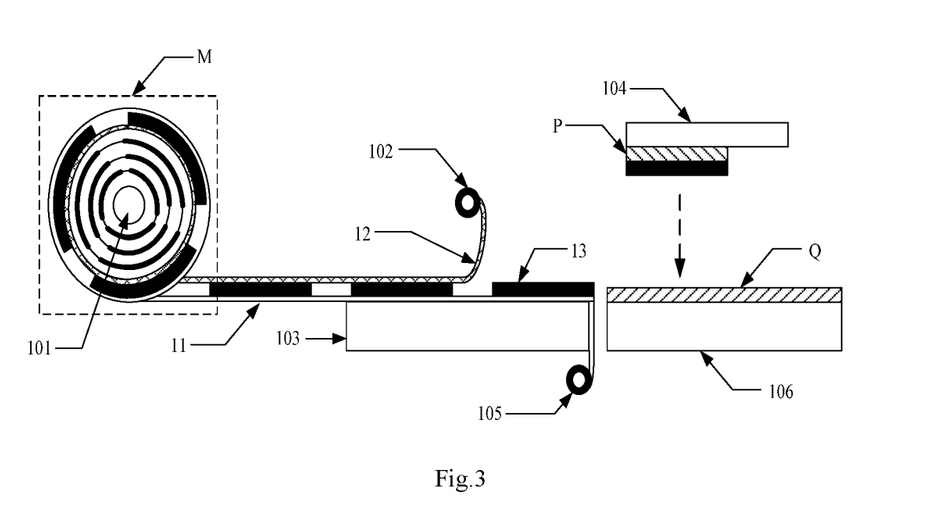
FIG. 3 is a schematic structural view of another attaching device for a fingerprint module provided by an exemplary embodiment.

FIG. 3 is a schematic structural view of another attaching device for a fingerprint module P provided certain exemplary embodiments. As shown in FIG. 3, the attaching device further includes a receiving assembly 105 for collecting the base film 11.

Optionally, referring to FIG. 3, the attaching device further comprises a supporting platform 106 for a display panel Q. The supporting platform 106 for the display panel Q is configured to support the display panel Q, and a display surface of the display panel Q faces the supporting surface of the display panel supporting platform 106 to expose a non-display surface (i.e., the back surface) of the display panel so as to attach the fingerprint module P.

As shown in FIG. 3, the attaching press head 104 is also used to attach the fingerprint module P to the non-display surface of the display panel Q through the adhesive layer 13 on the fingerprint module P, wherein the non-display surface is opposite to the display surface. The explanation of other reference numerals in FIG. 3 can refer to the corresponding explanation of such reference numerals in FIG. 2. It will be understood that the embodiments described herein are exemplary and that some embodiments of the present disclosure will not be described in detail herein.

It should be noted that the above-mentioned display panel Q is a self-luminous display panel, for example, the display panel Q may be an organic light emitting diode display panel or a quantum dot light emitting diode display panel, which is not limited in this respect in some exemplary embodiments.

As shown in FIGS. 2 and 3, in some exemplary embodiments, after the fingerprint module P and the adhesive layer 13 are attached by the attaching press head 104, the second adhesive surface of the adhesive layer 13 that is not attached to the fingerprint module P faces downward, so the firmly attaching of the fingerprint module P and the display panel Q supported on the supporting platform 106 can be realized by the adhesive layer 13 that has already been attached to the fingerprint module P. This can be accomplished without turning over the attaching press head 104. Compared with the prior art, the space occupied by the attaching device can be saved by not providing a turning mechanism. In addition, in some embodiments of the present disclosure, since the surface (i.e., the light receiving surface) of the fingerprint module P configured to attach to the adhesive layer 13 is always facing downward, the risk of foreign matters appearing on the light receiving surface can be reduced, thereby ensuring the attaching reliability of the fingerprint module P.

Figure 4:
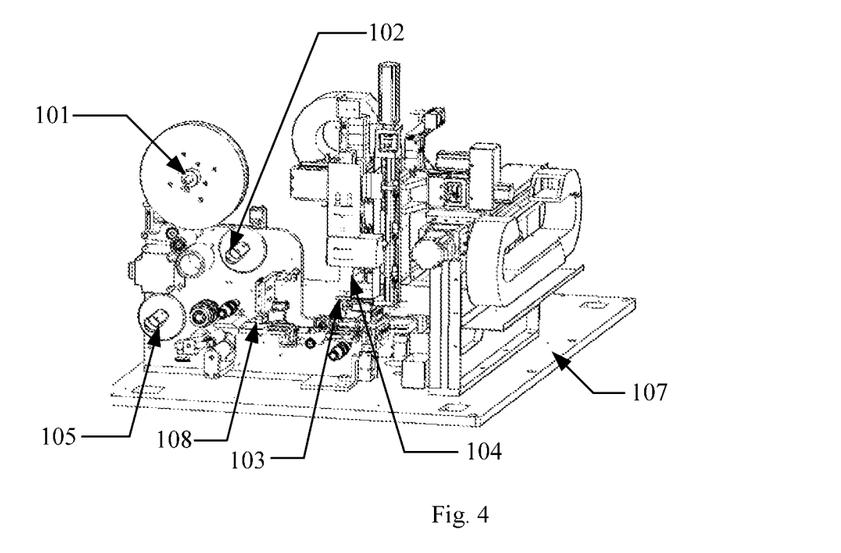
FIG. 4 is a schematic view of a physical structure of an attaching device for a fingerprint module according to an exemplary embodiment.

FIG. 4 is a schematic view of a physical structure of an attaching device for a fingerprint module according to some exemplary embodiments. As shown in FIG. 4, the attaching device further includes a film planarizing assembly 108 for planarizing the adhesive tape roll to form a flat tape; and a base 107. The adhesive tape feeding assembly 101, the protective film peeling assembly 102, the peeling platform 103, and the attaching press head 104 are assembled on the base 107. Further, the receiving assembly 105, the display panel supporting platform 106, and the film planarizing assembly 108 can also be assembled on the base in certain exemplary embodiments.

As shown in FIG. 4, the attaching device comprises an adhesive tape feeding assembly 101, a protective film peeling assembly 102, a peeling platform 103, an attaching press head 104, a receiving assembly 105, a display panel supporting platform 106, a film planarizing assembly 108 and a base 107. The working process of the attaching device is as follows in conjunction with FIG. 2-4:

The adhesive tape feeding assembly 101 includes an adhesive tape roll supplying assembly and a film planarizing assembly 108, wherein the adhesive tape roll supplying assembly is configured to supply an adhesive tape roll; the film planarizing assembly 108 is configured to planarize the adhesive tape roll. The planarized adhesive tape is conveyed to the peeling platform 103, the protective film 12 in the adhesive tape on the peeling platform 103 is connected with a protective film peeling assembly 102, and the base film 11 is connected with the receiving assembly 105. The protective film peeling assembly 102 is configured to peel off the protective film 12 of the adhesive tape located on the peeling platform 103 to expose the first adhesive surface of the adhesive layer 13. The attaching press head 104 is configured to attach the carried fingerprint module P to the exposed first adhesive surface of the adhesive layer 13, and peel off the attached fingerprint module P and adhesive layer 13 together from the base film 11 to expose the second adhesive surface of the adhesive layer 13. The receiving assembly 105 collects the base film 11 peeled off from the adhesive layer 13. The attaching press head 104 is configured to move the carried fingerprint module P and the adhesive layer 13 together to a position above the display panel supporting platform 106, and firmly attach the fingerprint module P to the non-display surface of the display panel Q through the second adhesive surface of the adhesive layer 13 already attached to the fingerprint module P.

To sum up, the attaching device for the fingerprint module provided by certain exemplary embodiments is configured to first peel off the protective film in the adhesive tape through the protective film peeling assembly. Since the protective film 12 is peeled off, the base film 11 and the adhesive layer 13 on the base film 11 are located on the peeling platform 103, and since the base film 11 is a heavy film, the adhesive force between the base film 11 and the adhesive layer 13 is much greater than the adhesive force between the protective film 12 and the adhesive layer 13, so the adhesive layer 13 is not easy to detach and wrinkle when the protective film 12 is peeled off, and the planarity of the exposed adhesive layer 13 on the base film 11 can be ensured. Then, the fingerprint module P and the exposed first adhesive surface of the adhesive layer 13 are attached by the attaching press head 104, and the attached fingerprint module P and the adhesive layer 13 are peeled off together from the base film 11. At this time, since the adhesive layer 13 and the fingerprint module P are firmly attached, the adhesive layer 13 is not prone to wrinkle or bend. In this way, on the one hand, the cost increase caused by the damage of the adhesive layer 13 is reduced, and the attaching yield of the fingerprint module P and the display panel can be ensured; on the other hand, after the fingerprint module P is attached to the adhesive layer 13, the peeling of the second adhesive surface of the adhesive layer 13 (i.e., the lower surface in FIG. 2) from the base film 11 can be completed directly by lifting the attaching press head 104 without turning the attaching platform 180 degrees, thus saving the turning time and ensuring the attaching efficiency of the fingerprint module P.

Figure 5:
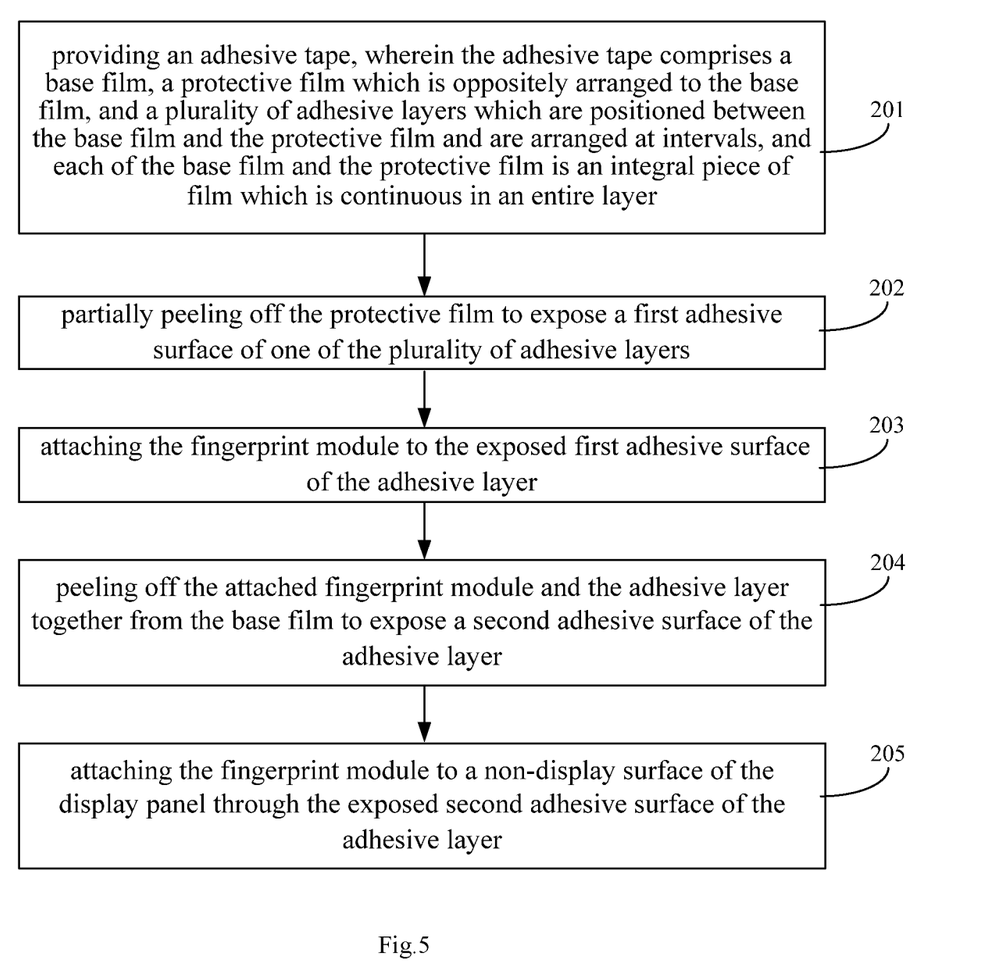
FIG. 5 is a schematic flow chart of an attaching method for a fingerprint module provided by an exemplary embodiment.

FIG. 5 is a flowchart of an attaching method for a fingerprint module provided by certain exemplary embodiments. As shown in FIG. 5, the method includes:

Step 201, providing an adhesive tape, wherein the adhesive tape comprises a base film 11 and a protective film 12 which is oppositely arranged to the base film, and a plurality of adhesive layers 13 which are positioned between the base film 11 and the protective film 12 and are arranged at intervals, and each of the base film 11 and the protective film 12 is a structure with an integral layer, that is, each of the base film 11 and the protective film 12 is an integral piece of film which is continuous in an entire layer.

In some exemplary embodiments, the thickness of the adhesive layer 13 ranges from 1 to 200 microns. Both the base film 11 and the protective film 12 are made from PET. Some exemplary embodiments do not limit the materials of the base film 11 and the protective film 12.

In some exemplary embodiments, the release force of the base film 11 is greater than that of the protective film 12. It should be noted that the release force of the base film 11 is greater than the release force of the protective film 12, which can ensure that when the protective film 12 is peeled off, the adhesive layer 13 adheres to the base film 11 instead of peeling off together with the protective film 12.

Step 202: peeling off the protective film 12 to expose the first adhesive surface of the adhesive layer 13.

Step 203: attaching the fingerprint module P to the exposed first adhesive surface of the adhesive layer 13.

It should be noted that in certain exemplary embodiments, each fingerprint module P is attached to an exposed first adhesive surface of each adhesive layer 13.

Step 204: peeling off the attached fingerprint module P and the adhesive layer 13 together from the base film together.

It should be noted that since the adhesive layer 13 and the fingerprint module P are firmly attached, the adhesive layer 13 is not prone to wrinkle or bend. Compared with the prior art, the cost increase caused by damage of the adhesive layer 13 can be prevented, and the attaching efficiency of the fingerprint module P and the display panel Q can also be ensured.

Step 205: attaching the fingerprint module P to a non-display surface of the display panel through the second adhesive surface of the adhesive layer 13 on the fingerprint module P.

It should be noted that the above display panel is a self-luminous display panel, for example, the display panel may be an OLED display panel or a QLED display panel, and some exemplary embodiments are not limited to this.

It should be noted that the sequence of the steps of the fingerprint module attaching method provided by some exemplary embodiments can be appropriately adjusted, and the steps can also be increased or decreased according to the situation. Any variations of the method that can easily occur to those of ordinary skill in the art within the technical scope disclosed in the present disclosure should be covered within the protection scope of the present disclosure, so it is not repeated here.

To sum up, in the attaching method for the fingerprint module provided by certain exemplary embodiments, the protective film in the adhesive tape is first peeled off by the protective film peeling assembly. Since after the protective film 12 is peeled off, the base film 11 and the adhesive layer 13 on the base film 11 are located on the peeling platform 103, and since the base film 11 is a heavy film, the adhesive force between the base film 11 and the adhesive layer 13 is much greater than the adhesive force between the protective film 12 and the adhesive layer 13, so the adhesive layer 13 is not easy to detach and wrinkle when the protective film 12 is peeled off, and the planarity of the exposed adhesive layer 13 on the base film 11 can be ensured. The fingerprint module P and the exposed first adhesive surface of the adhesive layer 13 are attached by the attaching press head 104, and the attached fingerprint module P and the adhesive layer 13 are peeled off together from the base film 11. At this time, since the adhesive layer 13 and the fingerprint module P are firmly attached, the adhesive layer 13 is not prone to wrinkle or bend. In this way, on the one hand, the cost increase caused by the damage of the adhesive layer 13 is reduced, and the attaching yield of the fingerprint module P and the display panel can be ensured. On the other hand, after the fingerprint module P is attached to the adhesive layer 13, the peeling of the second adhesive surface of the adhesive layer 13 (i.e., the lower surface in FIG. 2) from the base film 11 can be completed directly by lifting the attaching press head 104 without turning the attaching platform 180 degrees, thus saving the turning time and ensuring the attaching efficiency of the fingerprint module P.

It should be understood that although various features and beneficial effects of the present disclosure and specific details of the structure and function of the present disclosure have been set forth in the above description, these contents are merely exemplary, and the specific details thereof, especially the shape, size, number and arrangement of components, may be specifically changed within the scope of the principles of the present disclosure to the overall scope represented by the broad general meaning as claimed in the claims of the present disclosure.

Unless otherwise defined, all technical and scientific terms used in this specification have the same meaning as commonly understood by those skilled in the art to which this disclosure belongs.

Those skilled in the art will understand the term "substantially" herein (such as in "substantially all light" or in "substantially composed of") may also include embodiments having "wholly," "completely," "all," etc. Therefore, in the embodiment, the adjective is also substantially removable. Where applicable, the term "substantially" may also refer to 90% or more, such as 95% or more, specifically 99% or more, even more specifically 99.5% or more, including 100%. The term "comprise" also includes embodiments in which the term "comprise" means "consist of". The term "and/or" specifically refers to one or more of the items mentioned before and after "and/or". For example, the phrase "item 1 and/or item 2" and similar phrases may relate to one or more of items 1 and 2. The term "comprise" may refer to "consist of" in one embodiment, but may also refer to "include at least a defined category and optionally one or more other categories" in another embodiment.

Furthermore, the terms first, second, third, etc. in this specification and in the claims are used to distinguish between similar elements and do not denote any order, quantity, or importance. It should be understood that the terms so used are interchangeable under appropriate circumstances and that the embodiments of the present disclosure described herein are capable of operation in a different order than described or illustrated herein.

"Up", "down", "left" and "right" are only used to indicate the relative positional relationship. When the absolute position of the described object changes, the relative positional relationship may also change accordingly.

It should be noted that the above-mentioned embodiments illustrate rather than limit the present disclosure, and that those skilled in the art will be able to design many alternative embodiments without departing from the scope of the appended claims. In the claims, any reference signs placed between parentheses shall not be construed as limiting the claims. The use of the verb "to include" and its conjugations does not exclude the presence of elements or steps other than those stated in a claim. The words "a" or "an" in the claims of the present disclosure do not exclude plural numbers, and are only intended for convenience of description and should not be construed as limiting the scope of protection of the present disclosure.

The present disclosure may be implemented by means of hardware comprising several distinct elements, and by means of a suitably programmed computer. In the device claim enumerating several devices, several of these devices can be embodied by the same item of hardware. The mere fact that certain measures are recited in mutually different dependent claims does not indicate that a combination of these measures cannot be used to advantage.

The present disclosure is further applicable to devices that include one or more of the characterizing features described in this specification and/or shown in the drawings. The present disclosure further relates to methods or processes that include one or more of the characterizing features described in this specification and/or shown in the drawings.

The various aspects discussed in this patent may be combined to provide additional advantages. In addition, those skilled in the art will understand that embodiments can be combined, and more than two embodiments can also be combined. In addition, some features may form the basis of one or more divisional applications.

The invention claimed is:

1. A method for attaching a fingerprint module, comprising steps of:
   providing an adhesive tape, wherein the adhesive tape comprises a base film, a protective film, and a plurality of adhesive layers which are positioned between the base film and the protective film and are arranged at intervals, and each of the base film and the protective film is an integral piece of film which is continuous in an entire layer, wherein the base film and the protective film are respectively arranged at two opposite sides of the plurality of adhesive layers;
   partially peeling off the protective film to expose an entire first adhesive surface of one of the plurality of adhesive layers;
   attaching the fingerprint module to the exposed first adhesive surface of the adhesive layer; and
   peeling off the attached fingerprint module and the adhesive layer together from the base film to expose a second adhesive surface of the adhesive layer.

2. The method according to claim 1, wherein before providing an adhesive tape, the method further comprises:
   providing a roll of adhesive tape; and
   planarizing the roll of adhesive tape to form the adhesive tape.

3. The method according to claim 1, wherein partially peeling off the protective film to expose the first adhesive surface of the one of the plurality of adhesive layers comprises:
   conveying the adhesive tape towards the fingerprint module,
   during conveying of the adhesive tape towards the fingerprint module, partially peeling off the protective film to expose the first adhesive surface of the one of the plurality of adhesive layers.

4. The method according to claim 1, wherein attaching the fingerprint module to the exposed first adhesive surface of the adhesive layer comprises:
   conveying the adhesive tape towards the fingerprint module to align the exposed first adhesive surface of the adhesive layer with the fingerprint module; and
   pressing down the fingerprint module to attach to the exposed first adhesive surface of the adhesive layer.

5. The method according to claim 1, wherein peeling off the attached fingerprint module and the adhesive layer together from the base film to expose the second adhesive surface of the adhesive layer comprises:
   lifting the attached fingerprint module and the adhesive layer together to peel off from the base film so as to expose the second adhesive surface of the adhesive layer.

6. The method according to claim 1, wherein after peeling off the attached fingerprint module and the adhesive layer together from the base film, the method further comprises:
   moving the attached fingerprint module and the adhesive layer together to a position aligned with a display panel; and
   attaching the fingerprint module to a non-display surface of the display panel through the exposed second adhesive surface of the adhesive layer.

7. The method according to claim 1, wherein peeling off the protective film is achieved by winding the protective film onto a rotatable shaft and then rotating the shaft.

8. The method according to claim 1, wherein after peeling off the attached fingerprint module and the adhesive layer together from the base film, the method further comprises a step of winding up and collecting a peeled base film.

9. The method according to claim 1, wherein,
a thickness of the adhesive layer ranges from 1 to 200 microns.

10. The method according to claim 1, wherein, the base film and the protective film are both made from polyethylene terephthalate polymer.

11. The method according to claim 1, wherein,
a release force of the base film is greater than that of the protective film.

12. An attaching device for a fingerprint module, comprising an adhesive tape feeder, a protective film peeler, a peeling platform, an attaching presser, a fingerprint module and an adhesive tape,
wherein the adhesive tape feeder is configured to feed the adhesive tape, the adhesive tape comprises a base film, a protective film, and a plurality of adhesive layers which are positioned between the base film and the protective film and are arranged at intervals, wherein each of the base film and the protective film is an integral piece of film which is continuous in an entire layer, wherein the base film and the protective film are respectively arranged at two opposite sides of the plurality of adhesive layers;
wherein the protective film peeler is configured to peel off the protective film to expose an entire first adhesive surface of one of the plurality of adhesive layers;
wherein the peeling platform is configured to support the adhesive tape when peeling off the protective film and after peeling off the protective film, and the adhesive layer having the first adhesive surface is positioned at a side of the base film away from the peeling platform; and
wherein the attaching presser is configured to support the fingerprint module and is configured to press down the fingerprint module to attach to the exposed first adhesive surface of the adhesive layer, and is configured to peel off the attached fingerprint module and adhesive layer together from the base film to expose a second adhesive surface of the adhesive layer.

13. The attaching device according to claim 12, wherein the protective film peeler comprises a rotatable shaft, and peeling off the protective film is performed by winding the protective film onto the shaft and then rotating the shaft.

14. The attaching device according to claim 12, wherein the adhesive tape feeder comprises an adhesive tape roll supplying assembly and an adhesive tape roll planarizing assembly, wherein the adhesive tape roll supplying assembly is configured to supply an adhesive tape roll and the adhesive tape roll planarizing assembly is configured to planarize the adhesive tape roll to form the adhesive tape.

15. The attaching device according to claim 12, wherein the attaching device further comprises a receiver for collecting the base film.

16. The attaching device according to claim 12, wherein the attaching device further comprises a display panel supporting platform for supporting a display panel, wherein a display surface of the display panel faces a supporting surface of the display panel supporting platform, and wherein the attaching presser is further configured to attach the fingerprint module to a non-display surface of the display panel through the second adhesive surface of the adhesive layer.

17. The attaching device according to claim 12, wherein the attaching device further comprises a base onto which the adhesive tape feeder, the protective film peeler, the peeling platform and the attaching presser are assembled.

* * * * *

UNITED STATES PATENT AND TRADEMARK OFFICE
CERTIFICATE OF CORRECTION

PATENT NO. : 11,186,075 B2
APPLICATION NO. : 16/420218
DATED : November 30, 2021
INVENTOR(S) : Kunlong Zheng Page 1 of 1

It is certified that error appears in the above-identified patent and that said Letters Patent is hereby corrected as shown below:

On the Title Page

Please correct the first name of the first Assignee in item (73) to read as follows:
CHENGDU BOE OPTOELECTRONICS TECHNOLOGY CO., LTD., Sichuan (CN)

Signed and Sealed this
Eighth Day of August, 2023

Katherine Kelly Vidal
*Director of the United States Patent and Trademark Office*